United States Patent [19]

Lucas et al.

[11] Patent Number: 4,524,582

[45] Date of Patent: Jun. 25, 1985

[54] CONTROL SYSTEM FOR HYDRAULIC PRESSES

[75] Inventors: Delbert E. Lucas, Fairfield, Ohio; Stephen J. Lieland, Lawrenceburg, Ind.

[73] Assignee: Cincinnati Incorporated, Cincinnati, Ohio

[21] Appl. No.: 480,720

[22] Filed: Mar. 31, 1983

[51] Int. Cl.[3] .............................................. F16D 31/02

[52] U.S. Cl. .......................................... 60/421; 91/20; 100/48; 100/269 R

[58] Field of Search ................... 60/421; 91/6, 20, 31, 91/519; 100/48, 52, 53, 269 R

[56] References Cited

U.S. PATENT DOCUMENTS

| | | | |
|---|---|---|---|
| 3,108,759 | 10/1963 | McConegly | 91/20 X |
| 3,722,366 | 3/1973 | Richardson | 91/519 X |
| 4,209,987 | 7/1980 | Kononov et al. | 100/269 R X |
| 4,236,695 | 12/1980 | Morrison | 91/6 X |
| 4,356,763 | 11/1982 | Hagström | 100/48 |

FOREIGN PATENT DOCUMENTS

| | | | |
|---|---|---|---|
| 0644974 | 1/1979 | U.S.S.R. | 91/6 |

*Primary Examiner*—Sheldon J. Richter

*Assistant Examiner*—Randolph A. Smith

*Attorney, Agent, or Firm*—Frost & Jacobs

[57] ABSTRACT

A control system for controlling the movement of the slide of a hydraulic press of the type having a main cylinder containing a piston mounting the slide. The control system comprises an electronic processor, a pressure transducer to measure the pressure of hydraulic fluid applied to the piston to move the slide downwardly, a position encoder coupled to the slide to determine the vertical position of the slide, and a hydraulic circuit to supply hydraulic fluid under pressure to the cylinder to move the piston and slide upwardly and downwardly. The hydraulic circuit comprises a plurality of cartridge valves having controls actuable by outputs from the processor. The processor is capable of handling inputs, including inputs from the pressure transducer and position encoder, and outputs to control the hydraulic circuit to shift the slide upwardly and downwardly at different preselected speeds, to reverse downward travel of the slide at a preselected point based on either slide position or tonnage applied by the slide to a workpiece, and to adaptively optimize decompression of the hydraulic fluid in the hydraulic system at the end of downward movement of the slide.

19 Claims, 14 Drawing Figures

DOWN HIGH MODE

DOWN MEDIUM MODE

HIGH/LOW SHIFT STATE

DOWN LOW MODE

LOW DECOMPRESS MODE

MEDIUM DECOMPRESS MODE

HIGH UP MODE

LOW UP MODE

CONTROL SYSTEM FOR HYDRAULIC PRESSES

TECHNICAL FIELD

The invention relates to a control system for hydraulic presses and the like, and more particularly to a control system utilizing a plurality of cartridge valves controlled by a programmable signal processor.

BACKGROUND ART

The control system of the present invention could be applied to any hydraulically actuated system that reacts to a load. For example, the control system could be applied to hydraulically actuated press brakes, hydraulically actuated off-road equipment and the like. For purposes of an exemplary showing, the invention will be described in its application to a conventional hydraulically operated, C-frame, metal working press. An example of such a press is taught in U.S. Pat. No. 4,242,901.

In the development of this general class of presses, most of the earliest presses were mechanically actuated. The mechanical presses were characterized by a high number of strokes or work cycles per unit of time, but tonnage was achieved only at the bottom of the stroke and the work stroke was capable of minimal adjustments.

Prior art workers then turned their attention to hydraulically actuated presses which overcame most of the disadvantages of the mechanical presses, and offered additional advantages made possible through the use of hydraulic systems. However, hydraulically actuated presses were characterized by relatively slow cycle times.

Today, many industries are working with small production quantities. Under these circumstances, there is a need for a general purpose press capable of high production rates. The present invention is based upon the discovery that if a conventional hydraulic C-frame metal working press is provided with a control system utilizing cartridge valves in the hydraulic system actuated by a programmable signal processor, all of the advantages of hydraulic systems can be retained and improved upon, while achieving cycle speeds heretofore obtainable only with mechanically actuated presses.

The control system of the present invention permits close control of the movement of the press slide with various speed options available for approach to the workpiece, pressing of the workpiece and retraction of the slide. The position of the ram or slide is always known and the up-stroke of the ram can be initiated on the basis of tonnage or position. Further, the control system of the present invention optimizes decompression of hydraulic pressure in an adaptive manner, based upon the particular load conditions being encountered. This not only prevents hydraulic fluid surges, noise, and damage to the equipment, but also increases production speed capability, and allows the hydraulic fluid cooler and filter to be located in the main hydraulic circuit.

DISCLOSURE OF THE INVENTION

According to the invention there is provided a control system for the slide of a hydraulic press. The control system comprises means to shift the press slide downwardly and upwardly at preselected speeds; to cause reversal of downward travel of the slide at a preselected point determined on the basis of slide position or tonnage; and means to optimize decompression of hydraulic pressure based on the particular load conditions being encountered.

The press slide is operatively connected to the piston of the main press cylinder. The piston has a central bore extending downwardly from its upper end and terminating in a bottom bore surface. The bore is adapted to slidingly receive a downwardly depending plunger fixedly mounted within the main cylinder. The exterior surface of the piston is of lesser diameter than the interior surface of the main cylinder. The upper end of the piston has an annular flange having an outer diameter such as to be just nicely received within the main cylinder. The main cylinder, the plunger and the annular piston flange define an upper annular volume within the cylinder. The main cylinder, the piston and its upper flange define an outer annular volume within the cylinder, and the space between the bottom of the piston bore and the bottom end of the plunger defines a lower volume within the piston. The press is provided with a motor driven high volume pump and a motor driven low volume pump, the intakes of which are connected to a reservoir for hydraulic fluid. The outputs of the high volume pump and low volume pump are connected to a manifold block. The hydraulic fluid reservoir is also directly connected to the manifold block.

The manifold block contains a plurality of hydraulic fluid flow passages and a plurality of cartridge valves for opening and closing portions of these hydraulic fluid flow passages. The manifold block also contains a plurality of pilot fluid passages for each of the cartridge valves. The manifold has one passage connected to the outer annular volume of the main cylinder through a cartridge-type counterbalance valve. The manifold has a second passage connected directly to the lower volume of the cylinder. The same passage is connected to the upper annular volume of the cylinder through a separate cartridge valve. The upper annular volume of the main cylinder is connected directly to the hydraulic fluid reservoir through a prefill valve.

The control system also includes a programmable signal processor which controls the state of all of the cartridge valves except the counterbalance cartridge valve. The processor is capable of handling operator initiated control inputs setting the operating parameters of the press. The control system may additionally include a pressure transducer to measure the oil pressure in the main hydraulic line serving the press slide and a position encoder coupled to the press slide. Outputs of the pressure transducer and position encoder are connected to the processor. Outputs of the pressure transducer and position encoder enable the reversal of downward movement of the slide at any preselected tonnage value within the operating capacity of the press or at any preselected position of the slide.

DETAILED DESCRIPTION

Figure 1:
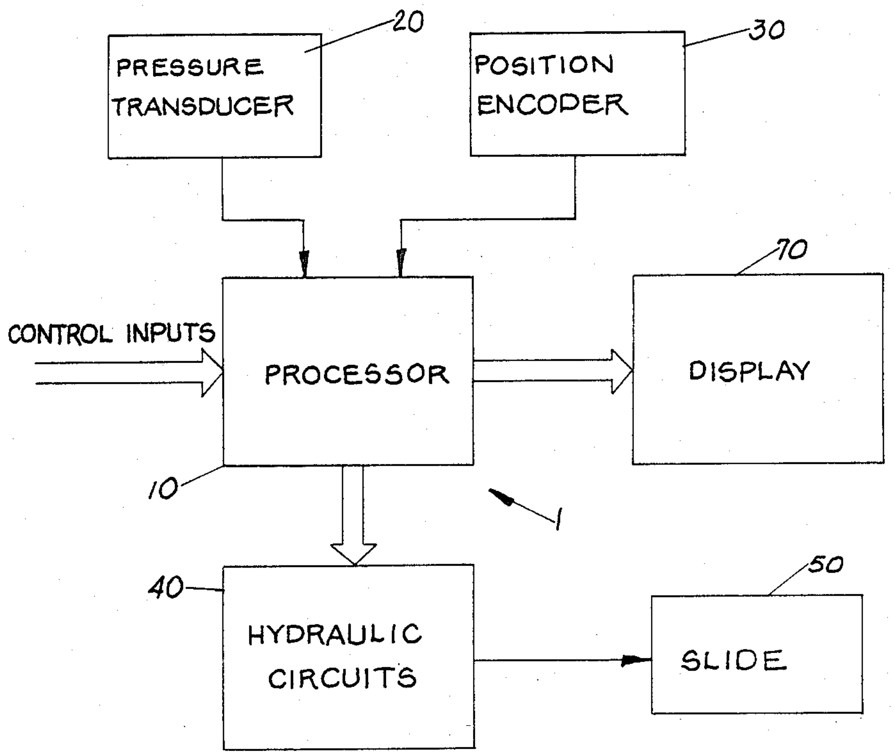
FIG. 1 is a block diagram of the control system of the present invention.

The block diagram of the control system of the present invention is illustrated generally at 1 in FIG. 1. The system is under control of a programmable signal processer 10. As used herein and in the claims, the term "processor" refers to a microprocessor, computer, microcomputer or other circuit capable of handling inputs and outputs to control a plurality of peripheral devices in accordance with a preprogrammed routine.

User initiated control inputs may be provided to processor 10 to set the operating perameters of the hydraulic press. For example, manual controls, not shown, may be associated with the press to permit the user to select the up and down stroke speed of the slide, the position at which the stroke is reversed, or the tonnage at which the stroke will reverse. Other user controlled inputs may also be provided to processor 10 depending on the particular features desired with the press.

A pressure transducer 20 is provided which measures the oil pressure in the main hydraulic line serving the press slide to provide an indication of the actual pressure or tonnage being exerted against the workpiece. As will be described in more detail hereinafter, the signal from pressure transducer 20 may be used in connection with the program associated with processor 10 to permit the operator to reverse the stroke of the slide at any preselected tonnage value within the operating capacity of the press. The signal from the transducer 20 is also used in determination of proper decompression times.

A position encoder 30 is coupled to the press slide to provide an input signal to processor 10 indicative of the vertical position of the slide. This signal may be used in connection with the internal processing of the processor to permit the operator to reverse the direction of slide travel at any predetermined point as will be described in more detail hereinafter.

A plurality of outputs from processor 10 are used to control the hydraulic circuits 40 which route the flow of the hydraulic fluid to control the movement and pressure applied to slide 50. The hydraulic circuits 40 will be described in more detail hereinafter.

Finally, the operational status of control system 1 may be provided on a visual display 70. For example, output signals from processor 10 may provide a visual display of slide position, tonnage, etc.

Figure 2:
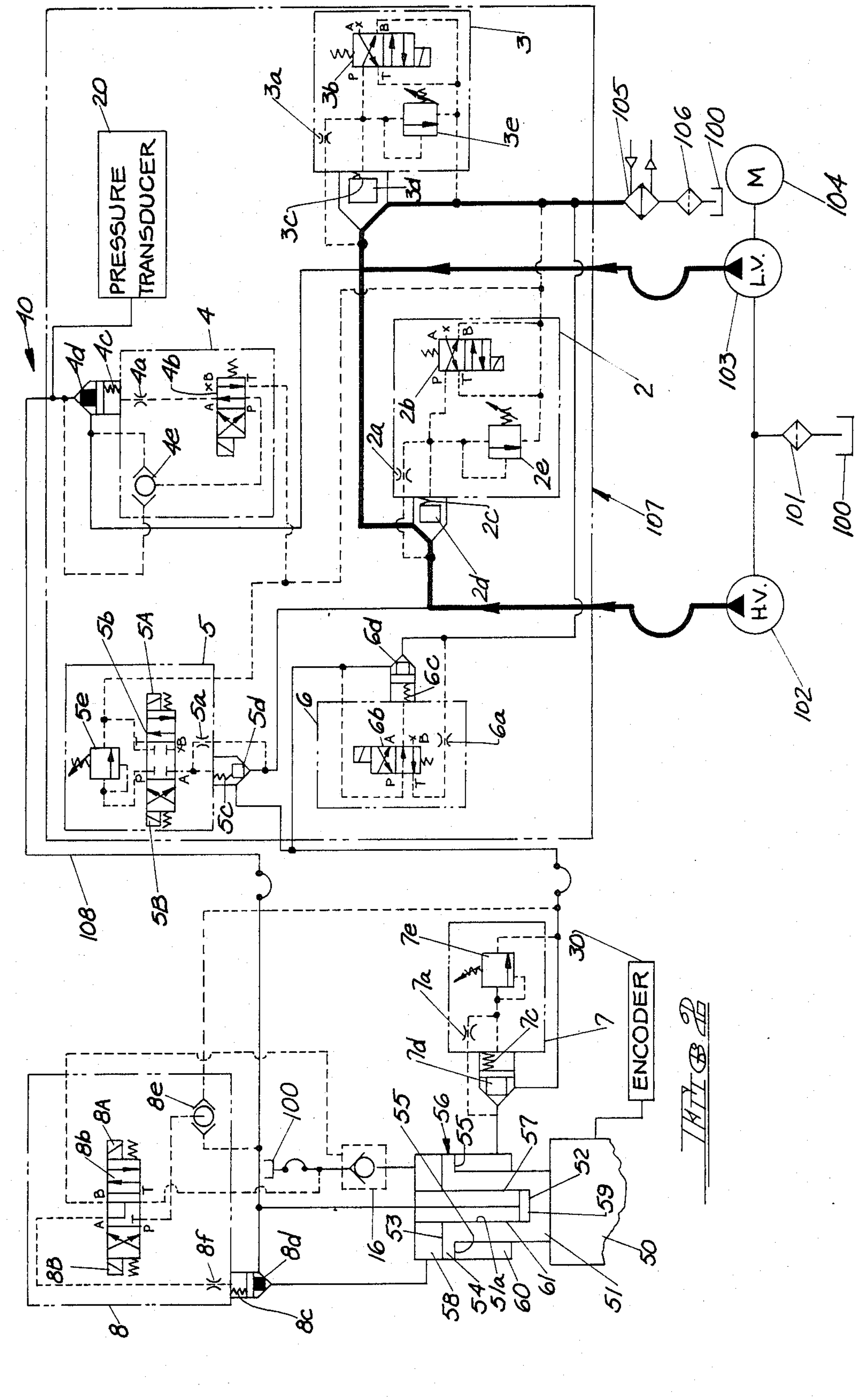
FIG. 2 is a schematic diagram of the hydraulic circuit of the control system of the present invention, illustrated in the idle mode.

For purposes of an exemplary showing, a preferred embodiment of hydraulic circuit 40 is illustrated schematically in FIG. 2, where elements similar to those previously described have been similarly designated.

Slide or ram 50 is operatively attached to a jack type annular-shaped piston 51 having a central bore 51*a*. The bottom of bore 51*a* forms a small working surface area 52, while the upper end of the piston forms a larger working area surface 53. The upper end of the piston is also enlarged to form a plate-like annular flange 54 having a generally flat undersurface 55.

Piston 51 is slidingly received within a generally cylindrical fixedly mounted cylinder 56, such that the peripheral edge of flange 54 slidingly engages the inner surface of the cylinder. Cylinder 56 is also provided with a downwardly depending fixedly mounted generally cylindrical plunger 57 which is dimensioned to slidingly engage within bore 51*a* of the piston 51.

The cooperation of piston 51 within cylinder 56 forms an upper annular volume 58 at the top of the cylinder, a lower volume 59 located between the lower end of plunger 57 and the working surface 52 of bore 51*a*, and an outer annular volume 60 located beneath flange 54. The purpose and function of each of these volumes will be described in more detail hereinafter. In general, however, when hydraulic fluid under pressure is introduced into upper annular volume 58, piston 51 and slide 50 will move downwardly. Similarly, when hydraulic fluid under pressure is introduced into lower volume 59, the slide 50 and piston 51 will also move downwardly, although with less force since the total surface area of small working surface 52 is smaller than the total area of large working surface 53. Slide 50 and piston 51 may be caused to move upwardly by introducing hydraulic fluid under pressure into outer annular volume 60 such that a force is created against the undersurface 55 of flange 54.

The hydraulic fluid used with hydraulic circuit 40 is retained in a suitable reservoir 100 which for purposes of clarity has been shown at three different locations in FIG. 2. It will be understood, however, that each of these represents the same hydraulic fluid reservoir. The fluid withdrawn from the reservoir is passed through a strainer 101 and supplied to a high volume pump 102 and a low volume pump 103. Each of these pumps is driven by an electric motor 104. For purposes of an exemplary showing, high volume pump 102 and low volume pump 103 may be of the fixed displacement type, delivering a substantially constant volume rate of flow at all times The output from high volume pump 102 is coupled to the input port of a solenoid operated normally open cartridge valve 2. In this arrangement, the main hydraulic fluid flow path has been designated in solid lines, while the pilot control path is designated in dashed lines. When the solenoid associated with valve 2 is de-energized, pilot fluid passes from the input of the valve through an orifice 2*a*. The pilot fluid then passes through the solenoid actuated 4-way, two position control valve 2*b* from the P input port to the B output port.

It will be understood that the oil pressure ahead of valve 2 only has to overcome the force from spring 2*c* to slide cartridge insert 2*d* to the right (as viewed in FIG. 2) to allow the oil to pass through. For example, spring 2*c* may be chosen to permit flow only when the pressure is 2½ atmospheres or approximately 35 psi.

When the solenoid is energized, the spool control valve 2*b* shifts so that oil entering input port P is directed to the output port A. In this case, there is no flow and the pressure on the control section is the same as the upstream pressure on the upstream cartridge insert 2*d*. With the particular valve shown, the area ratio of control to upstream side is chosen to be 1:1 so that the hydraulic forces balance. Spring 2*c*, however, exerts force to hold the cartridge insert 2*d* closed.

When the upstream pressure reaches a predetermined point, for example 2850 psi, the relief control section 2*e* shifts to the right as viewed in FIG. 2 to permit oil flow. When this occurs, a pressure drop is created across orifice 2*a* so that the pressure on the control side of cartridge insert 2*d* is less than the upstream pressure. When the pressure drop across the cartridge insert exceeds the force exerted by spring 2*c*, the cartridge insert begins to shift to the open position. Consequently, the pressure drop across valve 2 will be approximately 2850 psi in the specific application just described. Such valves are well known in the hydraulic control arts, and are supplied by such manufacturers as Rexroth or Vickers.

In any event, the operation of the solenoid associated with valve 2 is under control of processor 10 according to the specific program utilized as will be described in more detail hereinafter. It will be observed that valve 2 will be opened when the solenoid is de-energized, and closed when the solenoid is energized.

The outputs from cartridge valve 2 and low volume pump 103 are connected to the input port of cartridge valve 3. It will be understood that the construction and operation of cartridge valve 3 is identical to that of cartridge valve 2, except that the spring constant of spring 3*c* associated with cartridge insert 3*d* and the opening pressure of relief valve 3*e* may be different as required for a particular application. The operation of the solenoid associated with control valve 3*b* is under control of processor 10 such that valve 3 will be opened when the solenoid is de-energized and closed when the solenoid is energized.

The oil leaving control valve 3 is cooled by means of a cooling heat exchanger 105, passed through a filter 106, and returned to reservoir 100.

The hydraulic fluid flow from cartridge valve 2 and low volume pump 103 is also connected to the input port of a solenoid operated normally closed control valve 4, the operation and construction of which is similar to that previously described in connection with control valves 2 and 3. Valve 4 is provided with an orifice 4*a* connected between the control port of cartridge insert 4*d* and the A port of the solenoid operated 4-way two position control valve 4*b*. The P port output from the control valve is connected to the movable element of shuttle valve 4*e*. With the solenoid associated with valve 4 de-energized, a pressure imbalance is created across shuttle valve 4*e* which causes pilot pressure to be applied to port P of control valve 4*b* to hold the cartridge insert 4*d* closed. When the solenoid is energized, however, control valve 4*b* shifts to the right as viewed in FIG. 2, removing the pilot pressure to cartridge insert 4*d* and causing the valve to open. The operation of the solenoid associated with valve 4 is under control of processor 10 as will be described in more detail hereinafter.

The output from high volume pump 102 is also connected to the input port of solenoid operated normally closed cartridge valve 5. Cartridge valve 5 includes an orifice 5*a*, a 4-way three position control valve 5*b* (which may be placed in either of three operative positions under control of a first solenoid 5A or under control of a second solenoid 5B), a cartridge insert 5*d*, and a pressure relief valve 5*e*. For purposes of an exemplary showing, the pressure relief valve may be preset at 1750 psi.

With neither of solenoids 5A or 5B energized as illustrated in FIG. 2, pilot pressure across cartridge insert 5*d* is equalized and the valve remains closed. In the event that solenoid 5B is energized, the control valve 5*b* is shifted to the right (as viewed in FIG. 2) which causes a pressure drop across orifice 5*a*. This pressure drop unbalances the pressure on the pilot input line to the cartridge insert 5*d* causing the valve to open, depending on the pressure exerted by spring 5*c*. When solenoid 5A is energized, control valve 5*b* is shifted to the left. As a result, pilot fluid from orifice 5*a* is directed to pressure relief valve 5*e*. Thus, when the pressure in the system is greater than 1750 psi., pressure relief valve 5*e* will open, causing a pressure differential across cartridge valve 5, which will open. Since cartridge valve 5 is the only one between high volume pump 102 and cylinder 56, it can be used (when solenoid 5A is energized) to operate an accessory such as a part kicker (not shown), assuring a line pressure of at least 1750 psi.

The operation of solenoids 5A and 5B is under control of processor 10.

The output port of valve 5 is also connected to the input port of a solenoid operated normally closed cartridge valve 6. Again, the solenoid associated with this valve is under control of processor 10 such that when the solenoid is de-energized the valve is closed, and when the solenoid is energized the valve is opened.

When the valve is closed as illustrated in FIG. 2, the upstream oil from port P of the 4-way two position control valve 6*b* is directed to port A and onto the control section of the valve, causing valve 6 to close. If the upstream oil from port P is directed to blocked port B, and the control section oil goes from port A to port T, valve 6 will open. The output port of valve 6 is connected to the reservoir supply.

As shown in FIG. 2, cartridge valves 2–6 may be provided as part of a manifold block, shown generally at 107 (in broken lines). The interconnecting lines between the various valves and the other hydraulic components may be provided by channels within the manifold block as is well known in the art.

Referring to the left-hand portion of FIG. 2, the outer annular volume 60 associated with piston 51 is connected to the inlet port of normally closed counterbalance valve 7. This valve is similar to those previously described, except that it is not electrically operated. It also differs from the others in that it is a unique combination of a 1:2 poppet or logic element, together with a cartridge valve control incorporating a relief valve. Thus, the logic element 7*d* is similar to logic elements 4*d*, 6*d* and 8*d* used to stop or permit flow, while the pressure portion of valve 7 is similar to the pressure portions of valves 2 and 3 in that it incorporates a relief valve 7*e*, although it does not have a control valve similar to 2*b* or 3*b* because it is controlled by pressure rather than by processor 10.

It was discovered that this combination in valve 7 has the desirable characteristic of resisting sudden increases or surges in fluid flow through the valve. This desirable characteristic "catches" the piston and slide if the load on the tools and slide is suddenly released as during a stamping or punching operation. In other words, the pressure in volume 60 suddenly rises to a much higher value (1800 psi) than preset (450) and is released in a slow and controlled manner, thus dissipating the energy stored in the oil in volumes 59 and 58 and preventing hydraulic shock from entering the hydraulic system. Further, this allows the minimization of over-travel due to the tendency of the slide to accelerate after the load is released.

Valve 7 includes an orifice 7*a*, a cartridge insert 7*d* biased by a spring 7*c*, and a relief valve 7*e*. The relief valve may be so set that valve 7 remains closed until the desired predetermined pressure (for example 450 psi) is reached. Thus counterbalance valve 7 operates to maintain a threshold pressure on the bottom of the cylinder to support the weight of piston 51 and slide 50 and any associated tools . This counterbalance features reduces the possibility that the slide will fall unexpectedly. It will be also understood that valve 5 together with valve 6 serve as redundant valves to counterbalance valve 7, also operating to maintain pressure to support the weight of the slide. This redudancy reduces the possibility that the slide could fall as a result of a valve failure.

Hydraulic fluid is introduced into upper annular volume 58 of cylinder 56 from the output port of a solenoid operated normally open cartridge valve 8. The 4-way three position control valve **8*b* of valve 8 is under control of a first solenoid 8A and a second solenoid 8B. With both solenoids 8A and 8B de-energized, control valve 8*b* assumes the center position illustrated in FIG. 2. It will be understood that both solenoids are under the control of processor 10. With control valve 8*b* in its center position, the pilot inlet of cartridge insert 8*d* is connected through orifice 8*f* and ports A and T to reservoir 100, with the result that cartridge valve 8 is opened. With solenoid 8A energized, control valve 8*b* shifts to the left (as viewed in FIG. 2) so as to connect shuttle valve 8*e* through ports P and A of the control valve to the pilot inlet of cartridge insert 8*d*. Pressure is applied to shuttle valve 8*e* from either the top or the bottom of cylinder 56 and cartridge valve 8 will close. If solenoid 8B is energized, control valve 8*b* will shift to the right, connecting the pilot input to cartridge insert 8*d* through ports A and T of control valve 8*d* to reservoir 100 and valve 8 will open. Thus valve 8 will be open when both solenoids 8A and 8B are de-energized and when solenoid 8B is energized. However, when solenoid 8B is energized, pilot pressure from shuttle valve 8*c* will be connected through ports P and B to the pilot inlet of prefill valve 16**, next to be described.

Upper annular volume 58 of the slide is also connected to a pilot operated normally closed prefill valve 16. Construction of this valve is shown in more detail in FIG. 3.

Figure 3:
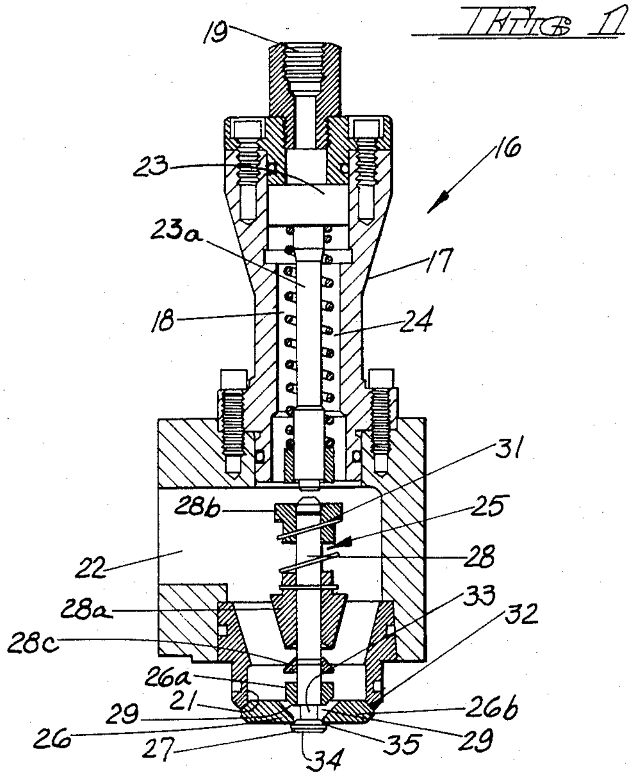
FIG. 3 is an elevational cross sectional view of the prefill valve 16 used in connection with the hydraulic circuit of the present invention.

Prefill valve 16 comprises an elongated valve housing 17 containing a longitudinally extending central bore 18. As shown in FIG. 3, the upper end of the valve is provided with a pilot inlet 19 which communicates with one end of bore 18. The opposite end of the bore forms a first port 21 communicating with upper annular volume 58 of cylinder 56. The valve 16 has a second port 22 through the side of valve housing 17 communicating with the reservoir 100.

A pilot piston 23 has a stem **23*a* which extends longitudinally within bore 18 and is biased by means of a compression spring 24 to the upper position shown in FIG. 3. Fluid pressure exerted against the upper end of pilot piston 23 through pilot inlet 19 will cause the pilot piston to move downwardly as viewed in FIG. 3**.

The lower portion of bore 18 adjacent ports 21 and 22 is provided with a longitudinally extending poppet section shown generally at 25. Poppet section 25 is made up of a main poppet element 26, a smaller decompression poppet element 27 and a stem 28.

Stem 28 is slidably mounted in a support **28*a* located within bore 18. The upper end of stem 28 carries a spring seat 28*b*, rigidly affixed to the upper end of stem 28. The stem 28 also carries a pusher member 28*c* rigidly affixed to the stem below support 28*a***.

Main poppet element 26 comprises a hub **26*a* slidingly mounted on stem 28 and a generally circular head 26*b*, constituting an integral part of hub 26*a***.

Decompression poppet 27 comprises a stem portion 33, constituting an integral part of stem 28 but of lesser diameter, and a head portion 34 attached to the lower end of stem portion 33. As can be seen in FIG. 3, main poppet head **26*b* is provided with a central opening 35 through which decompression poppet stem 33 extends, and which forms a seating surface for decompression poppet head portion 34. Central opening 35 is connected to bore 18 by a plurality of passages 29. Decompression poppet head portion 34 is normally biased against its seating surface formed by central opening 35, and main poppet head 26*b* is normally biased against its seating surface 32 by a compression spring 31 located about stem 28. One end of compression spring 31 is seated against support 28*a*, while the other end of spring 31 engages spring seat 28*b***.

In operation, decompression poppet 27 will unseat from its seating surface 35 when the pressure applied to pilot inlet 19 is greater than some fixed percentage, for example 20%, of the pressure applied to poppet head 34. Stem **23*a* of pilot piston 23 will shift downwardly against the action of spring 24 and will engage the upper end of stem 28, shoving it downwardly to open decompression poppet 27, shifting decompression poppet head portion 34 away from its seat 35. Main poppet 26 will unseat from its seating surface 32 when the pressure applied to pilot inlet 19 exceeds the pressure applied to main poppet head 26*b* and decompression poppet head 34 by an amount determined by the area relationship of main poppet head 26*b* to the smaller pilot piston 23. The stem 28 will be shifted downwardly by stem 23*a* until the pusher member 28*c* of stem 28 engages and shoves downwardly on the hub 26*a* of main poppet 26. Consequently, as will be explained in more detail hereinafter, hydraulic fluid flow through prefill valve 16 may be controlled in two stages, dependent upon the sequential opening of decompression poppet head portion 34 followed by the opening of main poppet head portion 26*b***.

FIG. 2 illustrates schematically the idle mode of operation of the control system 1 of the present invention. The boldface solid lines in this diagram serve to illustrate the main hydraulic fluid flow paths. The idle mode serves only to cool and clean the oil, and is a waiting period between working strokes. In this mode of operation, all solenoids are de-energized. The oil flow from high volume pump 102 flows through normally open valve 2 and joins the flow from low volume pump 103. It then passes through normally open valve 3, heat exchanger 105, filter 106 and returns to the reservoir 100. In this mode of operation, since valves 4 and 5 are closed, a failure of valve 2 and/or valve 3 would not cause an unintended slide motion. Furthermore, as indicated above, valve 6, together with valve 5, act as redundant valves to counterbalance valve 7 in order to maintain pressure to support the weight of the slide 50. This redundancy also reduces the possibility that the slide would inadvertently fall as a result of a valve failure.

As noted above, the operation of control system 1 is under the supervision of a processor 10, which may comprise a microprocessor, computer, microcomputer or the like. The sequencing of operations of processor 10 is controlled by a suitable control program which may be stored as firmware in a suitable ROM (read only memory) or the like. A flow diagram for implementing the control program is illustrated in FIG. 4A–FIG. 4C for each of the operating modes of the hydraulic press using the control system 1 of the present invention.

Figure 4A:
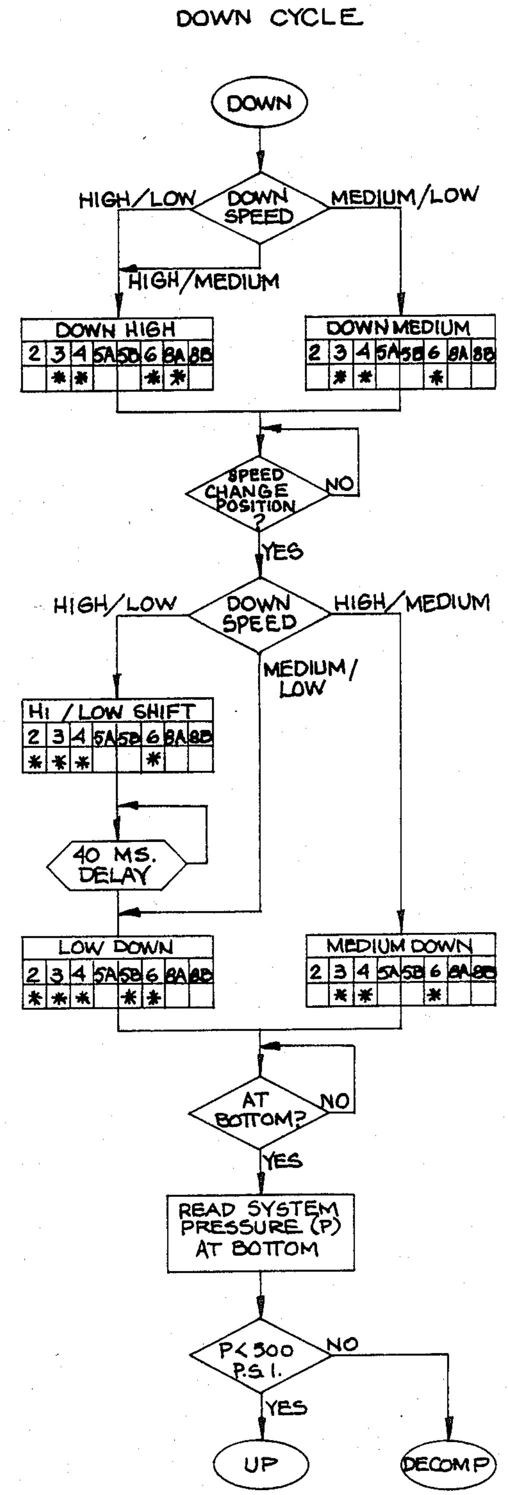
FIGS. 4A–4C are flow diagrams illustrating the processing of the control system of the present invention.
Figure 4B:
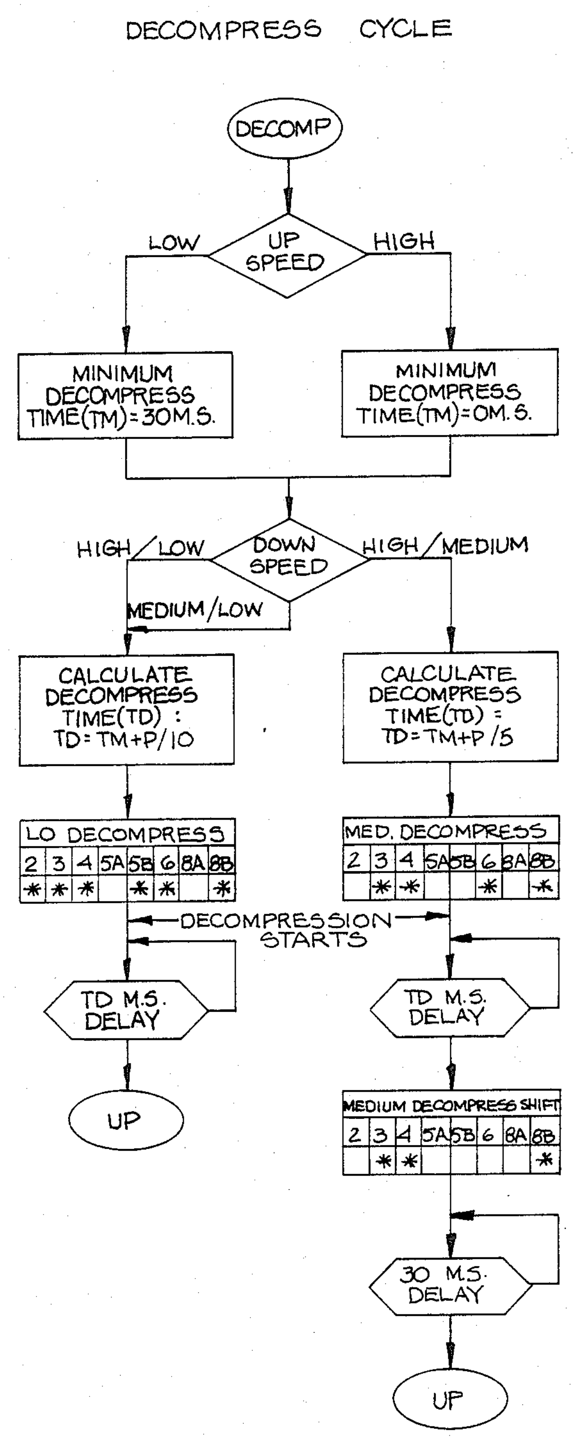
Figure 4C:
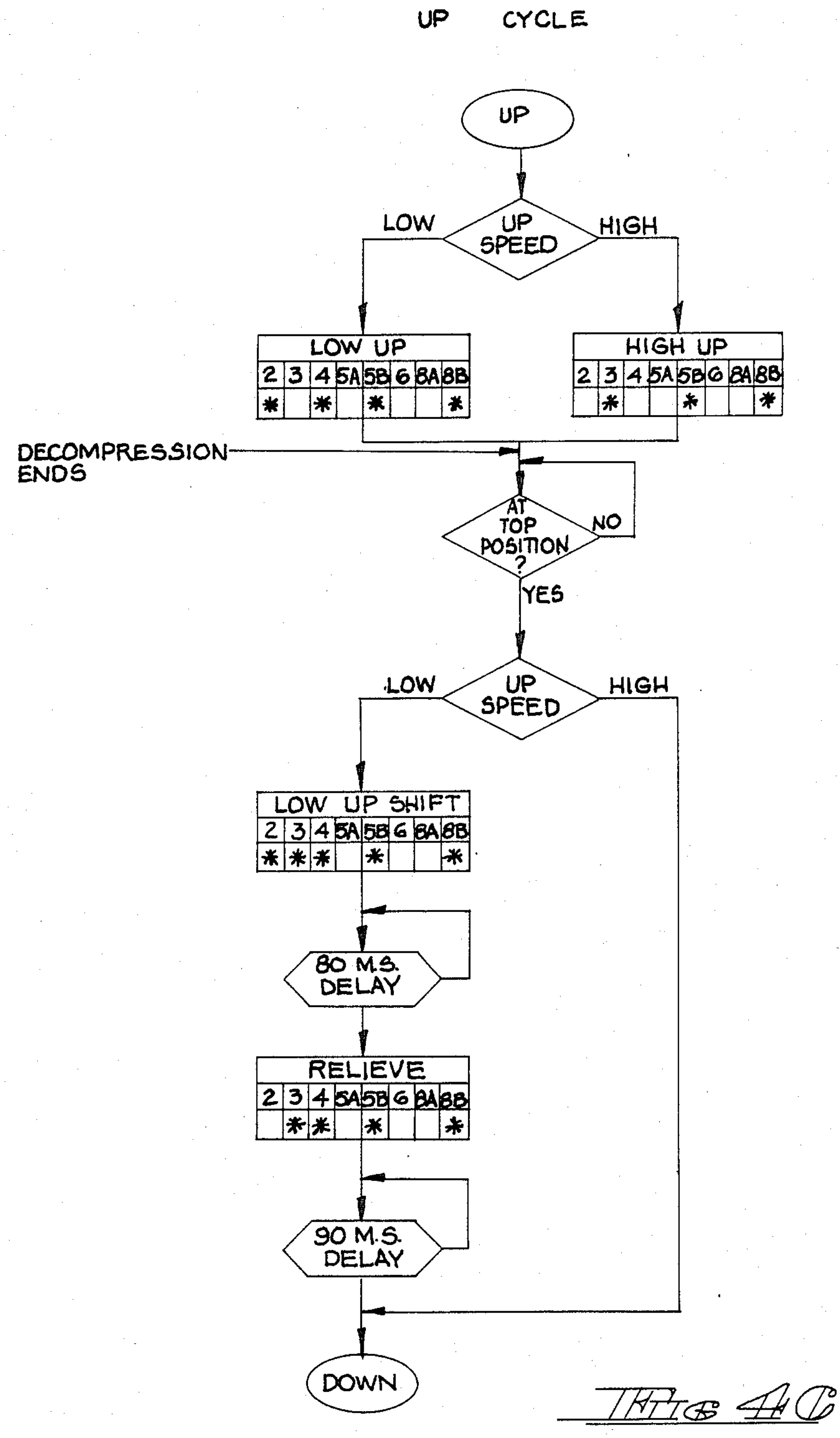

FIG. 4A illustrates the sequence of operations necessary to cause the slide to move downwardly at a relatively high speed, and thereafter at a lower speed to perform the actual work at high pressure against a workpiece. FIG. 4B illustrates the sequence of operations necessary to gradually decompress pressurized oil to relieve stored energy. As will be explained in more detail hereinafter, the time required for the decompress cycle is minimized in order to optimize the working speed of the press. Finally, FIG. 4C illustrates the sequence of operations necessary to move the slide upwardly at the end of the working stroke in preparation for a subsequent working stroke.

Turning to the down cycle illustrated in FIG. 4A, the operator first selects the combination of approach and working speeds for the slide. For example, the slide can be programmed to approach the workpiece at a high speed, then slows to a low speed for the working stroke at high tonnage (HIGH/LOW). Alternatively, the control system may be programmed to cause the slide to approach the workpiece at a high speed, then slows to a medium speed (HIGH/MEDIUM). Finally, the operator may program processor 10 so that the slide approaches the workpiece at a medium speed, then slows to a low speed for the working stroke (MEDIUM/LOW).

Assuming that the operator has selected a high initial approach speed, the processing will take the left-hand branch in FIG. 4A and enter the DOWN HIGH mode of operation. FIG. 4A diagrammatically illustrates the state of each of the solenoids associated with the control valves in this mode of operation. That is, those solenoids that are energized are marked with the symbol *. It will be understood that the actual state of a valve, that is whether it is open or closed, will be determined by the conditions described hereinabove; e.g., whether the valve is normally opened or closed, the state of the associated solenoid, pressure differentials, etc.

Figure 5:
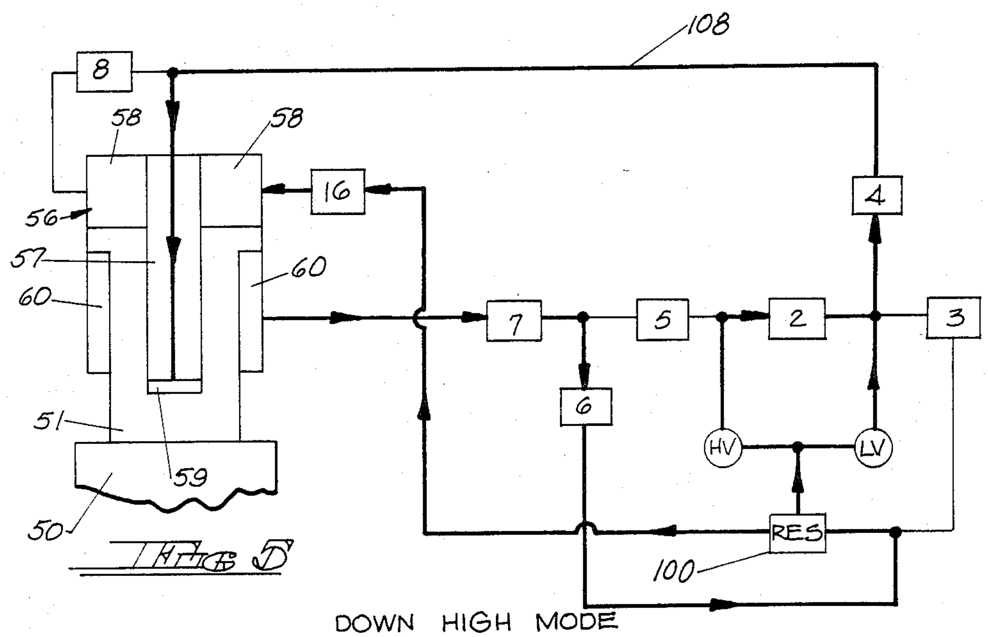
FIGS. 5–12 are flow diagrams of the hydraulic circuit of the present invention for each of the modes of operation.

FIG. 5 illustrates diagrammatically the main hydraulic flow path including the state of the control valves for the DOWN HIGH mode of operation, where elements previously described are similarly designated.

It will be observed that in this mode of operation, the solenoids associated with valves 3, 4, 6 and the solenoid 8A are energized. Consequently, valves 2, 4, 6, and 7 will be open in this mode of operation, while valves 3, 5 and 8 will be closed. The hydraulic fluid from high volume pump 102 and low volume pump 103 passes through valve 4, and fills lower volume 59 of bore 51*a*, at the lower end of plunger 57. This causes the slide 50 and piston 51 to move downwardly.

Since valve 8 is closed, a vacuum is created in upper annular volume 58 as the slide moves downwardly. When this vacuum reaches a predetermined figure, for example, 3 psig, light spring 31 will be overcome and the main poppet 26 of prefill valve 16 opens and permits hydraulic fluid to be rapidly pushed from reservoir 100 to upper annular volume 58 by atmospheric pressure. In an exemplary embodiment, the volume of hydraulic fluid pushed from reservoir 100 to upper annular volume 58 is approximately three times that pumped into the lower volume 59 by the high volume and low volume pumps. This process is referred to as "prefilling", and provides a very fast approach speed for slide 50 before the workpiece is contacted during the working stroke, while assuring that the upper annular volume 58 is filled with hydraulic fluid in preparation for the working stroke.

The hydraulic fluid contained in outer annular volume 60 which was formerly pressurized to support the slide passes through counterbalance valve 7 and opened valve 6 to reservoir 100. It should be noted that counterbalance valve 7 always maintains a threshold pressure on the undersurface 55 of flange 54 (by virtue of relief valve 7*e*) to support the weight of slide 50 and any tools associated therewith.

Returning to FIG. 4A, if the operator has selected a medium initial approach speed, the DOWN MEDIUM mode of operation is entered. In this mode, the solenoids associated with valves 3, 4 and 6 are activated, resulting in valves 2, 4, 6, 7 and 8 being opened and valves 3 and 5 being closed, as illustrated schematically in FIG. 6.

When solenoid 8A is de-energized, valve 8 opens and allows the hydraulic fluid from the low volume and high volume pumps to fill upper annular volume 58 as well as lower volume 59. Prefill valve 16 closes because there is no longer a vacuum present in upper annular volume 58.

Since the flow rate of the hydraulic fluid moved by the pumps is constant in both the DOWN HIGH and DOWN MEDIUM modes of operation, the downward speed of travel of slide 50 and piston 51 is slower in the latter case, because the total volume being filled by the pressurized hydraulic fluid is greater. In an exemplary showing, the slide speed is approximately $\frac{1}{4}$ as fast in the DOWN MEDIUM mode as in the DOWN HIGH mode.

In general, no work can be done in the DOWN HIGH mode of operation. Consequently, the downward speed of travel of the slide must be changed to a lower speed before the work is contacted. Returning to FIG. 4A, it can be seen that the processing requires a decision to be made between a low or medium speed work stroke. This is caused by a numerical setting of slide position by the operator where the change in speed is to occur. In general, the changeover point will occur near the work piece so that the maximum advantage may be gained by the rapid advance of the slide approaching the workpiece. As noted above, this greatly increases the number of workpieces which can be processed in a given length of time.

It will be observed that the processing of FIG. 4A continues to loop until the speed change position set point is reached. This is determined by the processing within processor 10 based on information derived from position encoder 30 connected to slide 50.

Figure 7:
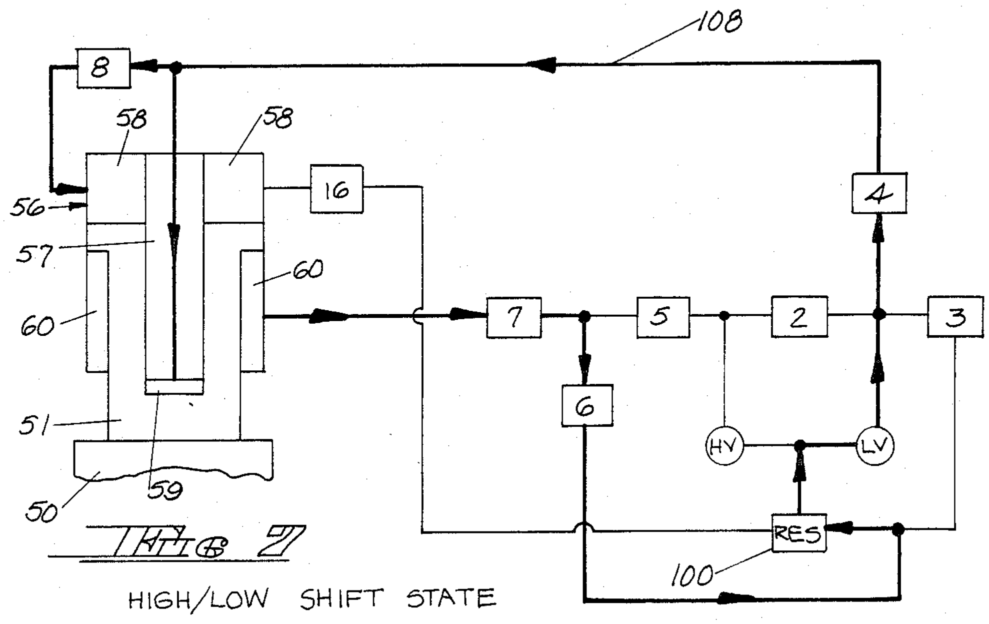

When the speed changeover point is reached, the processing shifts the downward speed of travel of the slide to the slower speed selected by the operator as described hereinabove. For example, if the selected speed combination is HIGH/LOW, the processing will cause an intermediate state designated HIGH/LOW SHIFT to be entered as illustrated diagrammatically in FIG. 7 wherein solenoids 2, 3, 4 and 6 are energized. In operation, valve 8 is opened and valve 2 is closed, removing high volume pump 102 from the hydraulic circuit. This state is maintained for a short delay, for example 40 milliseconds, and serves to minimize abrupt pressure changes in the hydraulic system in order to reduce noise and vibration. This is true because the HIGH/LOW SHIFT state assures that valve 2 is closed before valve 5 is opened in the DOWN LOW mode, next to be described.

Figure 8:
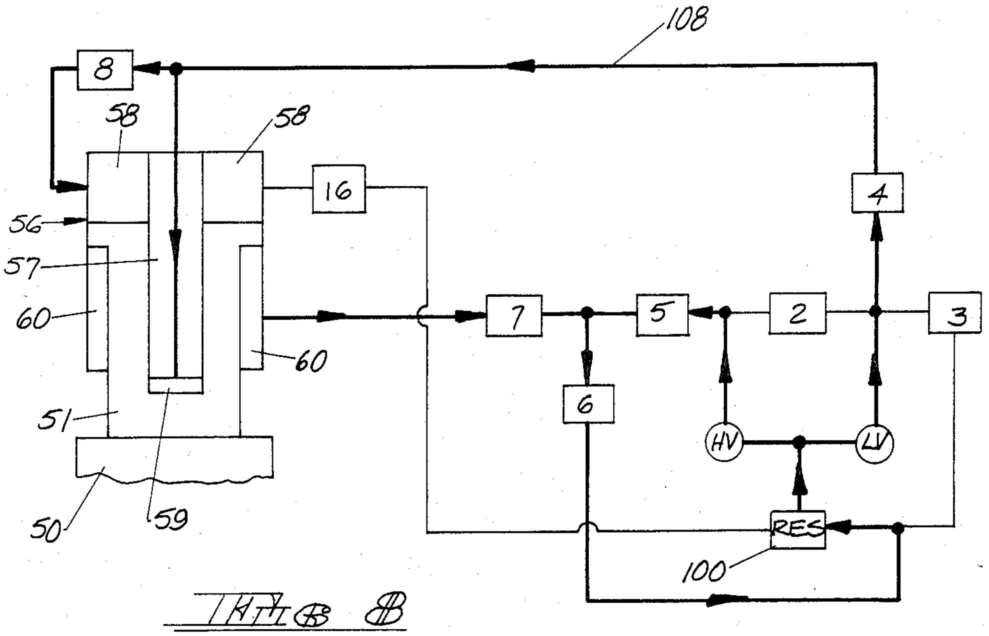

After this shift delay, the system enters the DOWN LOW mode of operation as illustrated in FIG. 8, where the solenoid associated with valve 5B is energized in addition to the solenoids previously energized in the HIGH/LOW SHIFT state. This causes valve 5 to open, permitting flow from high volume pump 102 to re-enter the hydraulic circuit, but to reservoir 100.

It will also be observed that the DOWN LOW mode may be entered directly if the operator has selected a medium initial approach speed, and a low working speed. In this instance, an intermediate shift mode is not necessary since the transition from medium speed to a low speed is less severe.

In the DOWN LOW mode of operation, as shown in FIG. 8, the hyraulic fluid delivered from the high volume pump 102 is returned to reservoir 100 so that this pump is unloaded. The hydraulic fluid from low volume pump 103 is divided between upper annular volume 58 and lower volume 59. The hydraulic fluid contained in outer annular volume 60, which serves to support slide 50, is returned through valves 6 and 7 to reservoir 100.

Figure 6:
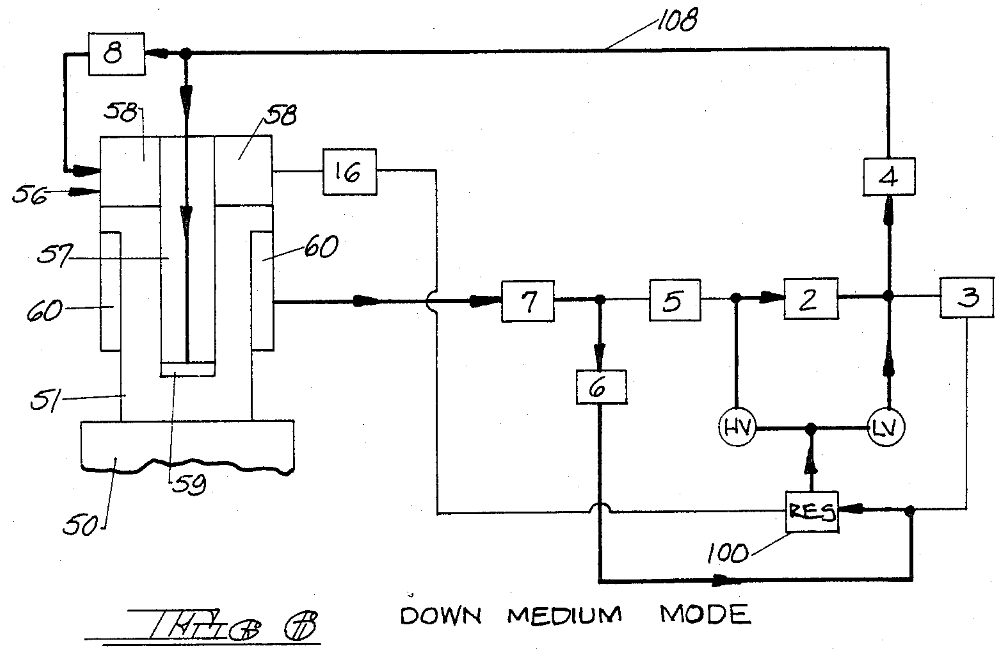

In the event that the operator has selected a high initial approach speed, followed by a medium working speed, the DOWN MEDIUM mode of operation is entered, where solenoids 3, 4 and 6 are energized as illustrated in FIG. 4A and FIG. 6. The operation of the hydraulic circuit will be the same as that described hereinabove in connection with the DOWN MEDIUM mode (see FIG. 6). Since the transition from a high approach speed to a medium working speed is less severe than for the HIGH/LOW mode described above (involving only the opening of valve 8), an intermediate shift state is unnecessary.

During the working stroke of the press, the slide continues downwardly until a bottom point is reached. This point may be a particular slide position or a particular press tonnage selected by the operator. In the case of a position command point, downward motion of the slide 50 continues until the particular bottom reversal position set point is reached, as determined by information derived from position encoder 30. In the case of a tonnage reversal set point, downward motion of the slide continues until a particular pressure in the main hydraulic line 108 serving upper annular volume 58 and lower volume 59 is sensed by pressure transducer 20 (see FIG. 2).

Regardless of which method is used to determine the bottom reversal set point, when this point is reached, the processing reads the pressure in line 108 as sensed by pressure transducer 20. If the pressure is relatively low, for example less than 500 psi, the direction of travel of the slide may be immediately reversed to permit withdrawal of the slide in the upward direction. However, if the pressure in main hydraulic line 108 is relatively large, for example greater than 500 psi, the system processing enters the DECOMPRESSION mode to gradually relieve the pressure in the system.

When the press is under a heavily loaded condition, considerable energy is stored in the frame and hydraulic fluid under pressure. This is because of the inherent elastic deformation of the structure and the compressibility of the hydraulic fluid. If the fluid under pressure is suddenly released back through cooling heat exchanger 105, filter 106 and reservoir 100, the resulting surge and shock reduces the life of the hydraulic components in its path. Sometimes this rapid decompression is also a source of noise.

To alleviate this condition, in the event that the system pressure is relatively high, the system enters the decompress cycle as illustrated in FIG. 4B. Initially, the operator can select whether the slide is to retract in the upward direction at a low or high speed. Assuming that a low speed has been selected, the processing initiates a minimum decompress time of 30 milliseconds. It will be understood that this time is generally determined empirically, and may differ for different types of presses and different pressing tonnages and retraction speeds. In the event that the operator selected a high up speed, a minimum decompress time of 0 ms. is selected.

In either event, the processing then retrieves the operator selected down speed as described previously in connection with the processing of FIG. 4A. In the event that a low working speed was selected (either HIGH/LOW or MEDIUM/LOW), the processor calculates the actual decompress time $TD=TM+P/10$, where TD (ms) is the total decompress time, TM is the minimum decompress time previously discussed, and P is the system pressure, the constant 10 being an empirical constant depending on the particular press and hydraulic system being used. It will be observed from this relationship that the total decompress time increases with increasing system pressure. In other words, when the press is heavily loaded and considerable energy is stored in the frame and hydraulic fluid, additional time is provided to gradually relieve the hydraulic pressure and the stored energy to prevent shock and noise.

Figure 9:
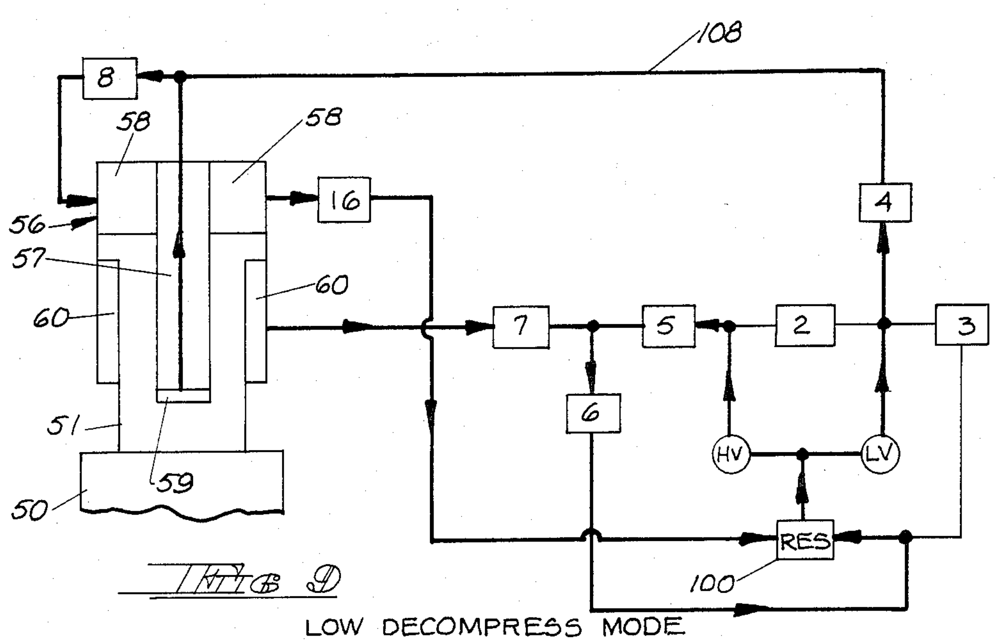

Following calculation of the total decompress time, the processing enters the LOW DECOMPRESS mode where solenoids 2, 3, 4, 5B 6 and 8B are energized, as illustrated in FIG. 9.

In this mode of operation, pressure and flow is from the top of the cylinder 51, i.e. from upper annular volume 58 through the control passage in cartridge valve 8, through shuttle valve *8e*, through the P and B ports of solenoid operated valve 8B, and to the pilot inlet 19 of prefill valve 16. Since the pressures on the pilot inlet 19 and on decompression poppet head 34 and main poppet head *26b* are balanced, only the small decompression poppet head 34 is opened (see FIG. 3) because of the greater area of piston 23 than decompression poppet head 34. Consequently, compressed hydraulic fluid is returned directly from prefill valve 16 to reservoir 100, bypassing cooling heat exchanger 105, filter 106, and manifold block 107, at a controlled rate without excessive noise or damage to the components. Since only the smaller decompression poppet head 34 is opened, the flow at this point is relatively small.

However, when the pressure in upper annular volume 58 falls to a relatively low value, for example 200 psi, the prefill valve 16 main poppet head *26b* is opened to cause normal flow from the upper annular volume 58 to reservoir 100 without causing unacceptable shock.

Returning to FIG. 4B, it will be observed that the system stays in the decompress cycle, for the duration of the calculated decompress time, and then branches to the up cycle to be described in detail hereinafter.

Figure 10:
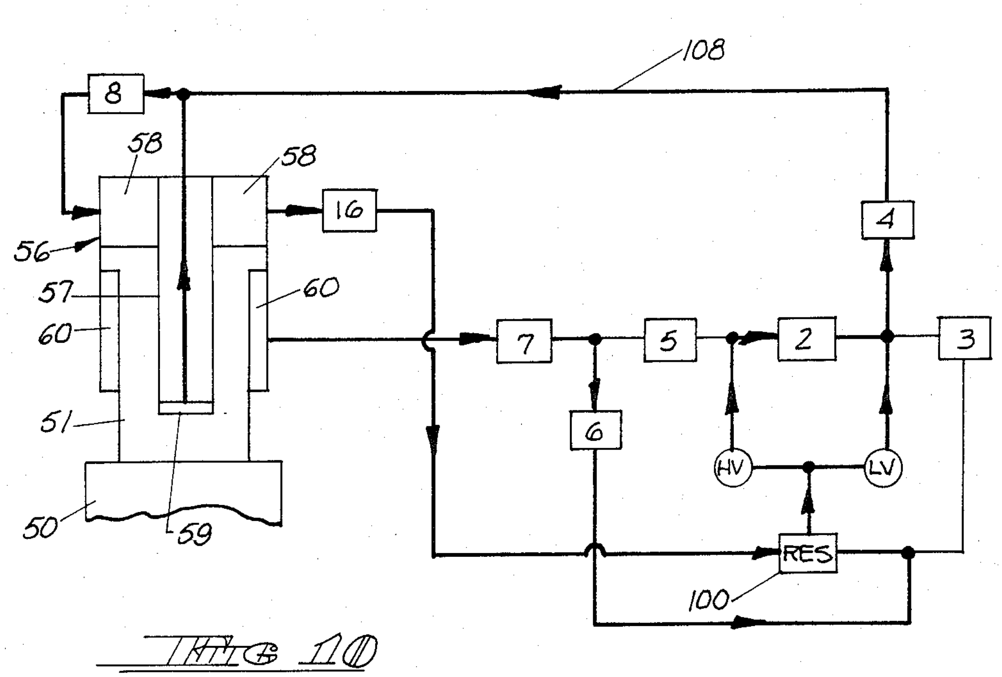

In the event that the operator had initially selected a medium working speed for slide 50, a different fixed empirical constant is used in the decompress time formula. This takes into account the fact that for medium downward speeds, the volume of hydraulic fluid to be relieved in the hydraulic circuit is greater than for low downward speeds. Under this condition, solenoids 3, 4, 6 and 8B are energized, resulting in the condition illustrated in FIG. 10. It will be observed that this condition is similar to the LOW DECOMPRESS mode, except that valve 2 is opened and valve 5 is closed, permitting the total flow from the high volume and low volume pumps to enter main hydraulic line 108. Consequently, only valve 8B is shifted when the processing transfers operation from the DOWN MEDIUM mode to the MEDIUM DECOMPRESS mode.

This condition persists for a portion of the decompress time. During this time, decompression poppet head 34 is open and main poppet head 26b is closed (again because of the greater area of piston 23 than decompression poppet 34) to relieve the pressure in the hydraulic circuit.

Thereafter, the processing enters an intermediate MEDIUM DECOMPRESS SHIFT state, where the solenoid associated with valve 6 is de-energized, causing valve 6 to close. The MEDIUM DECOMPRESS SHIFT state persists for a slight delay to assure that valve 6 is closed prior to the opening of valve 5 during the up mode (to be described hereinafter), to minimize abrupt pressure changes in the hydraulic system in order to reduce noise and vibration.

It will be observed that the decompress cycle is under control of processor 10 which reads the maximum tonnage signal from pressure transducer 20 and provides a time delay that is optimal for a given system pressure in order to gradually release the stored energy. Consequently, the control system 1 of the the present invention adapts itself to the actual pressure condition existing at the slide bottom reversal point. In conventional types of control systems, a single decompression time is chosen for all conditions. While this is adequate for maximum tonnage situations, low tonnage pressing conditions are over-compensated, and thus must operate at a much slower production speed. By using the processing of the present invention to not only optimize the decompression time, but also concurrently shift the various valves involved in initiating the UP MODE, the production speed capability of the system is greatly enhanced even when maximum tonnage is required. Consequently, adapting the decompression time to the requirements of the work to be done allows increased production rates on parts that do not require maximum tonnage. In addition, it will be observed that using cartridge valve 8 to direct the pilot control pressure for prefill valve 16 allows time to shift the valves and the start of the pressure rise within outer annular volume 60 to occur concurrently with the latter part of the decompression cycle. In other words, as the pressure within outer annular volume 60 exceeds the pressure in upper annular volume 58, the shuttle valve 8e shifts, and control fluid is ported by shuttle valve 8e through the P and A ports of valve 8 to the pilot section of prefill valve 16.

Figure 11:
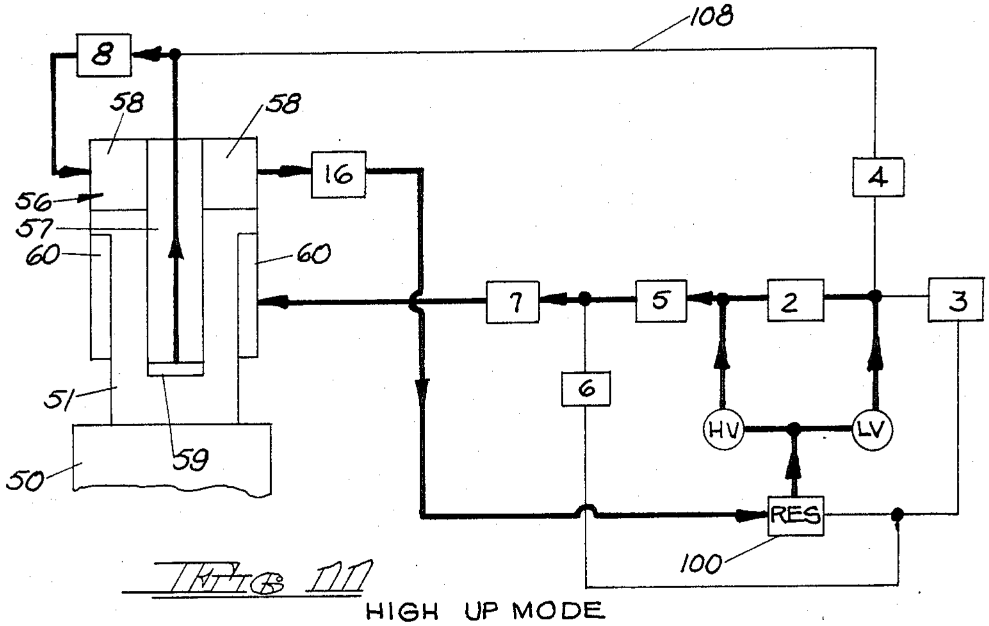

The processing of the up cycle is illustrated in FIG. 4C. A branch is made depending on the particular up speed selected by the operator. If a high up speed has been selected, the right-hand branch is taken which results in the solenoids associated with valves 3, 5B and 8B being energized. This results in the condition illustrated in FIG. 11. It will be observed that valves 2, 5, 7 and 8 are opened, while valves 3, 4 and 6 are closed. This results in a flow of hydraulic fluid from both the high volume and low volume pumps from reservoir 100 directly to outer annular volume 60, exerting pressure on undersurface 55 of flange 54 causing the piston 51 and slide 50 to move upwardly. At the same time, fluid is forced from lower volume 59 through valve 8 into upper annular volume 58, and from the upper volume through prefill valve 16 for return to reservoir 100.

As can be seen from FIG. 2 and FIG. 3, under this condition, the pressure from lower annular volume 60, which is applied to the pilot inlet of prefill valve 16 through shuttle valve 8e and ports P and B of 4-way three position control valve 8b, is greater than the pressure applied to valve port 21 from upper annular volume 58. As noted hereinabove, under this condition, main poppet 26b unseats, causing the maximum flow to occur from upper annular volume 58 to reservoir 100 as slide 50 travels upwardly. It will be noted that main poppet 26b opens after valve 5 is opened, and the opening of main poppet 26b constitutes the end of decompression.

It should be noted that in this mode of operation, valve 6 must be closed for the slide to return. Since valve 6 is one of the redundant valves which support the weight of the slide, it can be said that this valve is self-checking in that the slide will not go up if the valve fails to close. Redundant valve 5 is also self-checking since if it fails to open, the slide will not go up.

Figure 12:
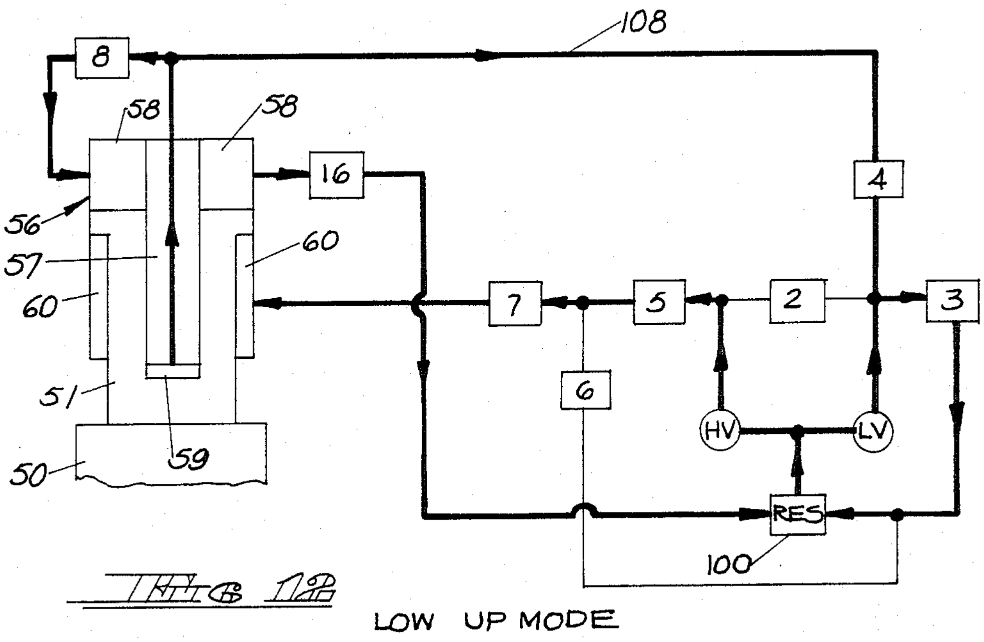

Returning to FIG. 4C, if the operator has selected the low up speed, the solenoids associated with valves 2, 4, 5B and 8B are energized, resulting in the hydraulic circuit condition illustrated in FIG. 12. It will be observed that flow from low volume pump 103 is recirculated through valve 3 and returned to reservoir 100, while only the flow from high volume pump 102 is directed through valves 5 and 7 to outer annular volume 60 to cause the slide to be pushed upwardly. In addition, the hydraulic fluid which is displaced from upper annular volume 58 is returned to reservoir 100 through prefill valve 16 as described hereinabove, and also returned to the reservoir through valves 3 and 4. Under these circumstances, valve 4 can be opened since valve 2 is closed.

In this mode of operation, the slide continues to move upwardly until a top position is reached. This is a vertical position sensed by position encoder 30, having been entered by the operator. When this point is reached, the system retrieves the information entered by the operator for the desired up speed. If a high return speed has been selected and the press programmed for continuous operation, the processing immediately returns to the down cycle mode for the next downward stroke. Otherwise, stroke movement terminates, and the system enters the idle mode as described hereinabove.

If the operator has selected the LOW UP speed option, the left-hand branch in FIG. 4C is followed. This approach is used primarily where additional control of the workpiece is desired. For example, if a die cushion is being used, it may be desirable to retract the slide at a relatively slow speed to prevent sudden release of the workpiece which could cause it to bounce upwardly. In this mode of operation, the hydraulic pressure is gradually released by energizing a combination of valves after a suitable delay.

For example, in the first instance, the solenoids associated with valves 2, 3, 4, 5B and 8B are energized, creating a LOW UP SHIFT state similar to the LOW UP mode of operation, except that valve 3 is closed.

After a short delay to assure that valve 3 is closed, the processing sequences to a RELIEVE state similar to the HIGH UP mode, except that valve 4 is opened enabling the energy stored in volume 60 and the outputs of the high and low volume pumps to go to reservoir 100 through valves 4, 8 and 16. After a short delay in this mode, the processing returns to the down cycle or the idle mode as previously described.

It will be observed that the control system of the present invention permits close control of the upward and downward movement of the slide associated with a hydraulic press. The workpiece may be approached rapidly by the slide, but pressed at a much slower speed. Thereafter, the slide may be retracted at selectable speeds. More importantly, however, the system processing permits the stored energy in the hydraulic fluid and frame of the press to be released in a controlled manner to reduce the shock and noise associated with the sudden release of pressure under high tonnage conditions. Furthermore, the control system of the present invention optimizes the decompression of hydraulic pressure based on the particular load conditions being encountered. All of the processing is automatic and under the control of a processor such as a microprocessor or microcomputer.

In a working embodiment of the present invention, cartridge valve 2 was a 1:1 valve having an orifice *2a* of 0.050 inch diameter. The relief valve *2e* was so set that valve 2 would open at about 2850 psi. Cartridge valve 3 was a 1:1 valve having an orifice *3a* of 0.050 inch diameter. Relief valve *3e* was so set that valve 3 would open at about 2850 psi. Cartridge valve 4 was a 1:2 valve with damping insert. Valve 4 had an orifice *4a* of 0.100 inch diamter. Cartridge valve 5 was a 1:1 valve with an orifice *5a* of 0.050 inch diameter and relief valve *5e* was so set that valve 5 would open at about 1750 psi. Cartridge valve 6 was a 1:2 valve having an orifice *6a* of 0.050 inch diameter. Counterbalance valve 7 was a 1:2 valve having an orifice *7a* of 0.035 inch diameter and relief valve *7e* was so set that valve 7 would open at about 450 psi. Cartridge valve 8 was a 1:2 valve with damping insert. Valve 8 had an orifice *8f* of 0.100 inch diameter. Finally, prefill valve 16 had a pilot piston 23 having an area ratio to decompression poppet 34 of 5:1 and an area ratio to main poppet head *26b* of 1:2.

It will be understood that various changes in the details, steps, materials and arrangements of parts, may be made herein within the principle and scope of the invention as expressed in the appended claims.

What is claimed is:

1. A control system for controlling the movement of the slide of a hydraulic press of the type having a main cylinder, a piston in said cylinder, a slide for applying tonnage to a workpiece, said piston mounting said slide, workpiece contacting tool means on said slide, at least one volume in said cylinder above said piston and a volume in said cylinder below said piston, a reservoir for hydraulic fluid to activate said main cylinder, a hydraulic circuit between said main cylinder and said reservoir for supplying hydraulic fluid under pressure to said cylinder to shift said piston and slide upwardly and downwardly, and a high volume pump and a low volume pump to supply hydraulic fluid under pressure from said reservoir to said hydraulic circuit, said control system comprising an electronic processor having inputs and outputs to control said hydraulic circuit in accordance with a preprogrammed routine, a pressure transducer positioned to measure and provide an output representative of the pressure of hydraulic fluid supplied to said cylinder by said hydraulic circuit to shift said piston and slide downwardly and thus representative of the tonnage applied by said slide against a workpiece, a position encoder coupled to said slide to provide an output indicating the vertical position thereof, said outputs of said pressure transducer and said position encoder being connected to the inputs of said processor, and said hydraulic circuit comprising a plurality of cartridge valves having control means actuable by outputs of said processor, said hydraulic circuit also including a cartridge valve between said volume below said piston and said reservoir serving as a counter-balance valve to maintain a threshold pressure in said volume below said piston to support the weight of said piston, slide, and tool means, said counter-balance cartridge valve being controlled by hydraulic fluid pressure directed to and exiting from said volume below said piston, and a prefill poppet valve between said at least one volume above said piston and said reservoir said prefill poppet valve being controlled by hydraulic pressure both below and above said piston.

2. The control system claimed in claim 1 wherein said piston has an outer diameter less than the inner diameter of said main cylinder, said piston having a lower end extending through said main cylinder and being operatively attached to said slide, said piston having an upper end provided with an annular flange slidingly and sealingly engaging the inside surface of said cylinder, said piston having an axial bore extending from its upper end downwardly and terminating short of said lower end of said piston in a small working surface of said piston, said cylinder having a downwardly depending plunger fixedly mounted therein and being so sized as to be slidingly and sealingly received within said piston bore, said upper end of said piston including the upper surface of said flange defining a large annular working surface of said piston, said flange having an undersurface comprising an annular working undersurface of said piston, said main cylinder, said large working surface of said piston and said plunger defining a variable upper annular volume of said main cylinder comprising one of said at least one volume above said piston, said bore of said piston, said plunger and said small working surface of said piston defining a variable lower volume of said main cylinder comprising another of said at least one volume above said piston, and said main cylinder, said piston and said piston working undersurface defining a variable outer annular volume of said main cylinder comprising said volume below said piston, whereby when hydraulic fluid under pressure is introduced into said upper annular volume, said piston and slide will move downwardly due to force on said large working surface of said piston, when hydraulic fluid under pressure is introduced into said lower volume, said piston and slide will move downwardly due to force on said small working surface of said piston, and when hydraulic fluid under pressure is introduced into said outer annular volume, said piston and slide will move upwardly due to force on said working undersurface of said piston.

3. The control system claimed in claim 2 wherein said hydraulic circuit comprises a first cartridge valve connected between the outputs of said high and low volume pumps, a second cartridge valve connected between the output of said low volume pump and said reservoir, a third cartridge valve connected between the output of said low volume pump and said lower volume of said main cylinder, a fourth cartridge valve connected between said lower volume of said main cylinder and said upper annular volume of said main cylinder, a fifth cartridge valve and said counterbalance cartridge valve being serially connected between the output of said high volume pump and said lower annular volume of said main cylinder, a sixth cartridge valve connected between the juncture of said fifth cartridge valve and said counterbalance cartridge valve and said reservoir, said first, second, third, fourth, fifth and sixth cartridge valves having said control means actuable by said outputs of said processor.

4. The control system claimed in claim 3 wherein said pressure controlled counterbalance valve comprises a 1:2 logic element and a control portion, said logic element having a control port, said control portion comprising a pilot control passage having a first portion containing an orifice and connecting said logic element control port to said lower annular volume of said main cylinder, said pilot control passage having a second portion connecting said first portion to said juncture of said counterbalance cartridge valve and said fifth cartridge valve, a relief valve located in said second portion of said pilot control passage arranged to permit flow to said juncture when actuated, said relief valve being set to maintain a predetermined threshold pressure in said lower annular volume of said main cylinder to support the weight of said piston and slide, said 1:2 logic element and said control portion of said counterbalance valve comprising means to resist sudden increases in pressure in said lower annular volume of said main cylinder encountered during punching or stamping operations of said press and to release such sudden increases in pressure in a slow and controlled manner.

5. The control system claimed in claim 3 wherein said prefill poppet valve comprises a valve body having a first port connected to said upper annular volume of said main cylinder and a second port connected to said reservoir, a small decompression poppet and a main poppet for said first port, means biasing said poppets to close said first port, said biasing means being arranged to open said main poppet when a vacuum exists in said upper annular volume of said main cylinder to permit flow of hydraulic fluid from said reservoir to said upper annular volume, said prefill valve having a pilot port for hydraulic fluid and a pilot piston, said pilot piston being arranged to open said small decompression poppet when the pressure of hydraulic fluid applied to said pilot port exceeds a predetermined percentage of the hydraulic pressure applied to said small decompression poppet from said upper annular volume, said pilot piston being arranged to open said main poppet when the pressure of hydraulic fluid applied to said pilot port exceeds the pressure applied to said main poppet and said small decompression poppet from said upper annular volume by an amount determined by the area relationship of said main poppet to said pilot piston.

6. The control system claimed in claim 5 wherein said fourth cartridge valve comprises a 1:2 logic element and a control portion, said logic element having a control port, said control portion of said fourth valve comprising a control spool valve having first, second and third positions, a pilot control passage connecting said logic element control port to said control spool valve, an orifice in said pilot control passage, a shuttle valve having an inlet port connected to the lower volume of said main cylinder, an inlet port connected to said juncture of said counterbalance cartridge valve and said fifth cartridge valve and an outlet connected to said control spool valve, said control spool valve in its first and second positions connecting said pilot control passage to said reservoir to open said fourth cartridge valve, said control spool valve in said third position connecting said pilot control passage to said shuttle valve to close said fourth cartridge valve, said control spool valve in said first position blocking the outlet of said shuttle valve and in its second position connecting said shuttle valve to said pilot port of said prefill valve.

7. The control system claimed in claim 3 wherein said processor includes means to operate said first and second cartridge valves to permit hydraulic fluid flow therethrough from said reservoir back to said reservoir and to operate said third, fourth, fifth and sixth valves to prevent hydraulic fluid flow therethrough to define an idle mode wherein said slide is at rest.

8. The control system claimed in claim 5 wherein said processor includes means to operate said first, third and sixth cartridge valves to permit hydraulic fluid flow therethrough and said second, fourth, and fifth cartridge valves to prevent hydraulic fluid flow therethrough to define a down high mode wherein hydraulic fluid under pressure from said reservoir is directed by said high volume and low volume pumps through said first and third cartridge valves to said lower volume of said main cylinder, wherein hydraulic fluid from said lower annular volume of said main cylinder is drained through said pressure operated counterbalance valve and said sixth cartridge valve to said reservoir and wherein a vacuum in said upper annular volume of said main cylinder is created to open said prefill valve main poppet to direct hydraulic fluid from said reservoir to said upper annular volume of said main cylinder, resulting in rapid downward movement of said piston and slide, said processor having means to initiate a speed change of said piston and slide at a predetermined vertical position of said slide upon receipt by said processor of an output from said encoder indicating that said slide has reached said predetermined speed change position.

9. The control system claimed in claim 5 wherein said processor includes means to operate said first, third, fourth and sixth cartridge valves to permit hydraulic fluid flow therethrough and said second and fifth cartridge valves to prevent hydraulic fluid flow therethrough to define a down medium mode wherein hydraulic fluid under pressure is directed by said high and low volume pumps from said reservoir through said first, third and fourth cartridge valves to said lower volume and said upper annular volume of said main cylinder, and wherein hydraulic fluid from said lower annular volume of said main cylinder is drained through said pressure operated counterbalance valve and said sixth cartridge valve to said reservoir, resulting in medium speed downward movement of said piston and said slide, said processor having means to initiate a speed change of said piston and slide at a predetermined vertical position of said slide upon receipt by said processor of an output from said encoder indicating that said slide has reached said predetermined speed change position.

10. The control system claimed in claim 8 wherein said processor includes means upon receipt of said speed change position output from said encoder to operate said third, fourth and sixth cartridge valves to permit hydraulic fluid flow therethrough and said first, second and fifth cartridge valves to prevent hydraulic fluid flow therethrough to define a high/low shift state and maintain said state for about 40 milliseconds wherein hydraulic fluid flow from said high volume pump is blocked, wherein hydraulic fluid flow from said low volume pump is directed through said third and fourth cartridge valves to said lower volume and said upper annular volume of said main cylinder and wherein hydraulic fluid is drained from said lower annular volume of said main cylinder through said counterbalance valve and said sixth valve to said reservoir, said processor having means to thereafter operate said third, fourth, fifth and sixth cartridge valves to permit hydraulic fluid flow therethrough and said first and second cartridge valves to prevent hydraulic fluid flow therethrough to define a down low mode wherein hydraulic fluid under pressure from said low volume pump is directed through said third and fourth cartridge valves to said lower volume and said upper annular volume of said main cylinder, wherein hydraulic fluid from said lower annular volume of said main cylinder is drained through said counterbalance valve and said sixth valve to said reservoir, and wherein hydraulic fluid from said high volume pump is directed through said fifth and sixth cartridge valves to said reservoir, said processor including means to maintain said down low mode until said slide reaches a predetermined bottom point indicated by an output of one of said position encoder and said pressure transducer.

11. The control system claimed in claim 8 wherein said processor includes means upon receipt of said speed change position output from said encoder to operate said first, third, fourth and sixth cartridge valves to permit hydraulic fluid flow therethrough and said second and fifth cartridge valve to prevent hydraulic fluid flow therethrough to define a down medium mode wherein hydraulic fluid under pressure from said reservoir is directed by said first, third and fourth cartridge valves to said lower volume and said upper annular volume of said main cylinder, and wherein hydraulic fluid from said lower annular volume of said main cylinder is drained through said pressure operated counterbalance valve and said sixth cartridge valve to said reservoir resulting in medium speed downward movement of said piston and said slide, said processor including means to maintain said down medium mode until said slide reaches a predetermined bottom point indicated by an output of one of said position encoder and said pressure transducer.

12. The control system claimed in claim 9 wherein said processor includes means upon receipt of said speed change position output from said encoder to operate said third, fourth, fifth and sixth cartridge valves to permit hydraulic fluid flow therethrough and said first and second cartridge valves to prevent hydraulic fluid flow therethrough to define a down low mode wherein hydraulic fluid under pressure from said low volume pump is directed through said third and fourth cartridge valves to said lower volume and said upper annular volume of said main cylinder, wherein hydraulic fluid from said lower annular volume of said main cylinder is drained through said counterbalance valve and said sixth valve to said reservoir, and wherein hydraulic fluid from said high volume pum is directed through said fifth and sixth cartridge valves to said reservoir, said processor including means to maintain said down low mode until said slide reaches a predetermined bottom point indicated by an output of one of said position encoder and said pressure transducer.

13. The control system claimed in claim 10 wherein said processor at the end of said down low mode includes means to receive an output of said pressure transducer and means if said last mentioned output is above about 500 psi to calculate an actual decompression time according to the relationship:

$$TD = TM + P/k$$

where TD is the total decompression time, TM is the minimum decompression time according to the operator selected speed of upward movement of said piston and slide, P is said last mentioned output of said pressure transducer and k is a fixed constant, said processor also having means to operate said third, fourth, fifth and sixth cartridge valves to permit hydraulic fluid flow therethrough and said first and second cartridge valves to prevent hydraulic fluid flow therethrough and to shift said control spool valve of said fourth cartridge valve to said second position to define and maintain for said time TD a low decompress mode wherein hydraulic fluid under pressure from said reservoir is directed by said low volume pump through said third and fourth cartridge valves to said upper annular volume of said main cylinder, wherein hydraulic fluid from said lower annular volume of said cylinder is drained through said pressure controlled counterbalance valve and said sixth cartridge valve to said reservoir, wherein hydraulic fluid under pressure from said high volume pump is directed through said fifth and sixth cartridge valves to said reservoir and wherein said small decompression poppet of said prefill poppet valve is opened directing hydraulic fluid from said upper annular volume to said reservoir followed by opening of said main poppet valve when the hydraulic fluid pressure in said upper annular volume diminishes.

14. The control system claimed in claim 12 wherein said processor at the end of said down low mode includes means to receive an output of said pressure transducer and means if said last mentioned output is above about 500 psi to calculate all actual decompression time according to the relationship:

$$TD = TM + P/k$$

where TD is the total decompression time, TM is the minimum decompression time according to an operator selected speed of upward movement of said piston and slide, P is said last mentioned output of said pressure transducer and k is a fixed constant, said processor also having means to operate said third, fourth, fifth and sixth cartridge valves to permit hydraulic fluid flow therethrough and said first and second cartridge valves to prevent hydraulic fluid flow therethrough and to shift said control spool valve of said fourth cartridge valve to said second position to define and maintain for said time TD a low decompress mode wherein hydraulic fluid under pressure from said reservoir is directed by said low volume pump through said third and fourth cartridge valves to said upper annular volume of said main cylinder, wherein hydraulic fluid from said lower annular volume of said cylinder is drained through said pressure controlled counterbalance valve and said sixth cartridge valve to said reservoir, wherein hydraulic fluid under pressure from said high volume pump is directed through said fifth and sixth cartridge valves to said reservoir and wherein said small decompression poppet of said prefill poppet valve is opened directing hydraulic fluid from said upper annular volume to said reservoir followed by opening of said main poppet valve when the hydraulic fluid pressure in said upper annular volume diminishes.

15. The control system claimed in claim 11 wherein said processor at the end of said down medium mode includes means to receive an output of said pressure transducer and means if said last mentioned output is above about 500 psi to calculate an actual decompression time according to the relationship:

$$TD = TM + P/k$$

where TD is the total decompression time, TM is the minimum decompression time according to an operator selected speed of upward movement of said piston and slide, P is said last mentioned output of said pressure transducer and k is a fixed constant, said processor having means to operate said first, third, fourth and sixth cartridge valves to permit hydraulic fluid flow therethrough, said fifth cartridge valve to prevent hydraulic fluid flow therethrough and to shift said control spool valve of said fourth cartridge valve to said second position to define and maintain for said time TD a medium decompress mode wherein hydraulic fluid under pressure is directed through said third and fourth cartridge valves to said upper annular volume of said main cylinder, wherein hydraulic fluid from said lower annular volume of said main cylinder is drained through said pressure controlled counterbalance valve and said sixth cartridge valve to said reservoir and wherein said small decompression poppet of said prefill poppet valve is opened directing hydraulic fluid from said upper annular volume to said reservoir, said processor having means after passage of said time TD to operate said sixth cartridge valve to prevent hydraulic fluid flow therethrough to define a medium decompress shift state to minimize abrupt pressure change in said hydraulic circuit.

16. The control system claimed in any one of claims 10–12 wherein said processor has means to operate said first, fourth and fifth cartridge valves to permit hydraulic fluid flow therethrough and said second, third and sixth cartridge valves to prevent hydraulic fluid flow therethrough and to shift said control spool valve of said fourth cartridge valve to its second position to define a high up mode wherein hydraulic fluid under pressure from said reservoir is directed by high and low volume pumps through said first and fifth cartridge valves and said counterbalance valve to said lower annular volume of said main cylinder to shift said piston and slide upwardly, wherein hydraulic fluid is directed from said lower volume of said main cylinder to said upper annular volume thereof, and wherein said pilot port of said prefill valve is connected through said control spool valve and said shuttle valve of said fourth cartridge valve to said juncture between said counterbalance valve and said fifth cartridge valve opening the main poppet of said prefill valve to direct hydraulic fluid from said upper annular volume of said main cylinder to said reservoir, said processor including means to maintain said high up mode until said slide reaches a predetermined top position as indicated by an output of said position encoder.

17. The control system claimed in any one of claims 10–12 wherein said processor has means to operate said second, third, fourth, and fifth cartridge valves to permit hydraulic fluid flow therethrough and said first and sixth cartridge valves to prevent hydraulic fluid flow therethrough and to shift said control spool valve of said fourth cartridge valve to its second position to define a low up mode wherein hydraulic fluid under pressure is directed from said reservoir by said high volume pump through said fifth cartridge valve and said counterbalance valve to said lower annular volume of said main cylinder to shift said piston and slide upwardly, wherein said output of said low volume pump is directed through said second cartridge valve to said reservoir, wherein hydraulic fluid from said lower volume of said main cylinder is directed through said fourth cartridge valve to said upper annular volume thereof, wherein said pilot port of said prefill valve is connected through said control spool valve and said shuttle valve of said fourth cartridge valve to said juncture of said counterbalance valve as said fifth cartridge valve opening said main poppet of said prefill valve to direct hydraulic fluid from said upper annular volume of said main cylinder to said reservoir and wherein hydraulic fluid is directed from said upper annular volume of said main cylinder through said second and third cartridge valves to said reservoir, said processor including means to maintain said low up mode until said slide reaches a predetermined top position as indicated by an output of said position encoder, said processor including means to operate said second cartridge valve to prevent hydraulic fluid flow therethrough to define a low up shift state for about 80 milliseconds, said processor having means to thereafter operate said first cartridge valve to permit flow therethrough to define a relieve state for about 90 milliseconds to relieve pressure in said hydraulic circuit.

18. The control system claimed in any one of claims 13–15 wherein said processor has means to operate said first, fourth and fifth cartridge valves to permit hydraulic fluid flow therethrough and said second, third and sixth cartridge valves to prevent hydraulic fluid flow therethrough and to shift said control spool valve of said fourth cartridge valve to its second position to define a high up mode wherein hydraulic fluid under pressure from said reservoir is directed by high and low volume pumps through said first and fifth cartridge valves and said counterbalance valve to said lower annular volume of said main cylinder to shift said piston and slide upwardly, wherein hydraulic fluid is directed from said lower volume of said main cylinder to said upper annular volume thereof, and wherein said pilot port of said prefill valve is connected through said control spool valve and said shuttle valve of said fourth cartridge valve to said juncture between said counterbalance valve and said fifth cartridge valve opening the main poppet of said prefill valve to terminate decompression and to direct hydraulic fluid from said upper annular volume of said main cylinder to said reservoir, said processor including means to maintain said high up mode until said slide reaches a predetermined top position as indicated by an output of said position encoder.

19. The control system claimed in any one of claims 13–15 wherein said processor has means to operate said second, third, fourth, and fifth cartridge valves to permit hydraulic fluid flow therethrough and said first and sixth cartridge valves to prevent hydraulic fluid flow therethrough and to shift said control spool valve of said fourth cartridge valve to its second position to define a low up mode wherein hydraulic fluid under pressure is directed from said reservoir by said high volume pump through said fifth cartridge valve and said counterbalance valve to said lower annular volume of said main cylinder to shift said piston and slide upwardly, wherein said output of said low volume pump is directed through said second cartridge valve to said reservoir, wherein hydraulic fluid from said lower volume of said main cylinder is directed through said fourth cartridge valve to said upper annular volume thereof, wherein said pilot port of said prefill valve is connected through said control spool valve and said shuttle valve of said fourth cartridge valve to said juncture of said counterbalance valve as said fifth cartridge valve opening said main poppet of said prefill valve to terminate decompression and to direct hydraulic fluid from said upper annular volume of said main cylinder to said reservoir and wherein hydraulic fluid is directed from said upper annular volume of said main cylinder through said second and third cartridge valves to said reservoir, said processor including means to maintain said low up mode until said slide reaches a predetermined top position as indicated by an output of said position encoder, said processor including means to operate said second cartridge valve to prevent hydraulic fluid flow therethrough to define a low up shift state for about 80 milliseconds, said processor having means to thereafter operate said first cartridge valve to permit flow therethrough to define a relieve state for about 90 milliseconds to relieve pressure in said hydraulic circuit.

* * * * *